United States Patent [19]

Braun

[11] 4,211,212

[45] Jul. 8, 1980

[54] SOLAR REFRIGERATION SYSTEM

[76] Inventor: Raymond J. Braun, 1641 Church St., Oakland, Calif. 94621

[21] Appl. No.: 974,439

[22] Filed: Dec. 29, 1978

Related U.S. Application Data

[63] Continuation-in-part of Ser. No. 839,598, Oct. 5, 1977, abandoned.

[51] Int. Cl.² ............................................. F24J 3/02
[52] U.S. Cl. ...................................... 126/439; 126/425; 126/440
[58] Field of Search ................... 126/270, 271, 425; 237/1 A; 350/299, 293, 288, 297

[56] References Cited

U.S. PATENT DOCUMENTS

| | | | |
|---|---|---|---|
| 4,038,972 | 8/1977 | Orrison | 126/271 |
| 4,089,323 | 5/1978 | Trihey | 126/271 |
| 4,116,540 | 9/1978 | Thomas | 350/297 |
| 4,126,014 | 11/1978 | Kay | 62/2 |

OTHER PUBLICATIONS

Farber, E. A. et al., "A Solar Powered Tracking Device for Solar Concentrators", Journal of Environmental Sciences, vol. 18, No. 3, pp. 11–12, May–Jun. 1975.

Primary Examiner—James C. Yeung
Attorney, Agent, or Firm—Robert R. Tipton

[57] ABSTRACT

A solar reflector defining a concave parabola of revolution having flared ends and a central saddle region collects solar energy which is reflected onto an arcuate reflector which in turn reflects the received energy to a solar energy absorbing device which converts the solar energy in thermal energy to operate a gas absorption refrigeration unit. The apparatus is maintained at all times perpendicular to the solar energy through the use of a thermally expandable fluid actuating system to compensate for the sun's seasonal declination.

7 Claims, 7 Drawing Figures

SOLAR REFRIGERATION SYSTEM

CROSS-REFERENCES TO RELATED APPLICATION

This application is a continuation-in-part of application Ser. No. 839,598, filed Oct. 5, 1977, abandoned.

BACKGROUND OF THE PRIOR ART

This invention relates generally to devices for receiving and converting solar energy and in particular to devices for receiving and converting solar energy into other forms of energy such as for refrigeration purposes.

In the past many devices have been used to receive and reflect solar energy in order to concentrate and utilize this form of power and convert it to another useful form. Such devices have included lenses, parabolic mirrors generally having a point focus, parabolic mirrors having a linear focus, as well as ordinary flat panels painted with a black or solar radiation absorbing material which is intended to convert the visual and short infrared solar energy in to heat or long wave length infrared energy.

The concept of this invention is a system to collect heat from solar energy and convert it to provide refrigeration as an alternative source, opposed to the electro/mechanical and fuel powered refrigeration systems.

Prior developments to the state of the art have relied on fixed collectors or the use of external power for following the sun's travel. On the fixed collector (W. R. Hainsworth U.S. Pat. No. 2,297,761) it is evident that the sun's rays striking at an angle will reflect off a large part of the energy. To follow the sun as shown in other developments (e.g., Courtis U.S. Pat. No. 2,182,222) requires a power source and timing-switching devices. It is also the purpose of this invention to provide refrigeration in remote areas where no mechanical power is available of the type which has been shown earlier (A. T. Brenser U.S. Pat. No. 2,030,350).

SUMMARY OF THE INVENTION

The system described herein (with no external power applied), is intended by virtue of its configuration to utilize solar energy such that a continuous flow of refrigerant is provided in an efficient, economical manner throughout the daylight hours and, by means of a tracking mechanism, throughout the sun's seasonal changes.

Major components of this system are the solar collector with tracking mechanism, focal mirror, and the gas generator assemblies, all aligned to rotate about a common axis. The other major components, are the gas absorption-refrigeration unit, and the standby fuel powered generator unit, with some modification, are commercially available.

In the event of prolonged darkness, and integral auxiliary generator unit will provide refrigeration. A heat exchanger or "cold sink" having known heat capacity will be sized to provide refrigeration for prolonged periods.

The apparatus of the present invention comprises, basically, a base support on which is mounted a first reflector defining a concave parabola of revolution having first and second flared ends, an axis of revolution and a central saddle region. A means for absorbing solar energy is also mounted on the base support and located proximate the central saddle of the first reflector. A second reflector defining and arc is located proximate the acuate focus of said first reflector and is adapted to reflect the solar energy reflected from the first reflector on to the means for absorbing solar energy. Means for cooling a space is also connected to the means for absorbing solar energy.

It is, therefore, an object of the present invention to porvide a device for collecting and converting solar energy into another useful form of energy.

It is a further object of the present invention to provide an apparatus for receiving solar energy that is always facing the solar energy source to obtain maximum utilization of the apparatus without consuming energy from an outside source.

It is still another object of the present invention to provide a solar energy utilization system in which the energy is collected by a reflector defining a concave parabola of revolution rotated about the paraboloic axis not crossing the parobolic surface.

It is still another object of the present invention to provide a solar energy refrigeration system utilizing a parabolic reflector system having an arcuate focus at which point a second reflector is used to direct the solar energy to a solar energy absorber.

It is a further object of the present invention to provide a solar energy refrigeration system in which the solar energy receiver is maintained pointed at the sun and rotated to acount for the declination of the sun for the various seasonal changes.

These and other objects of the present invention will be manifest upon careful study of the following detailed description when taken together with the drawings.

DESCRIPTION OF THE PREFERRED EMBODIMENT

Figure 1:
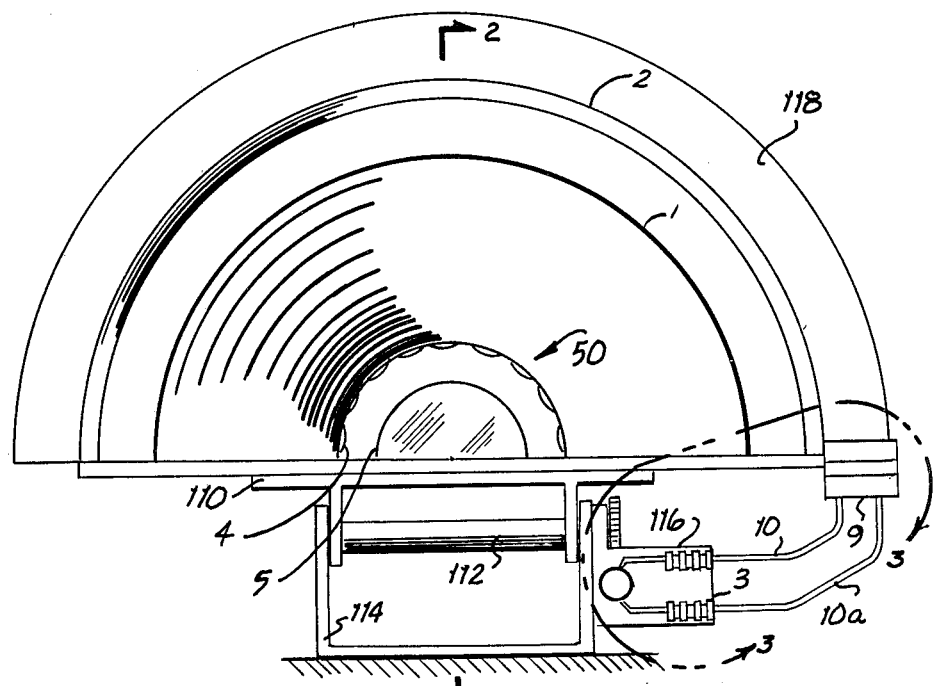
FIG. 1 is a front view (north-south elevation) showing the general arrangement of the collector assembly.
Figure 6:
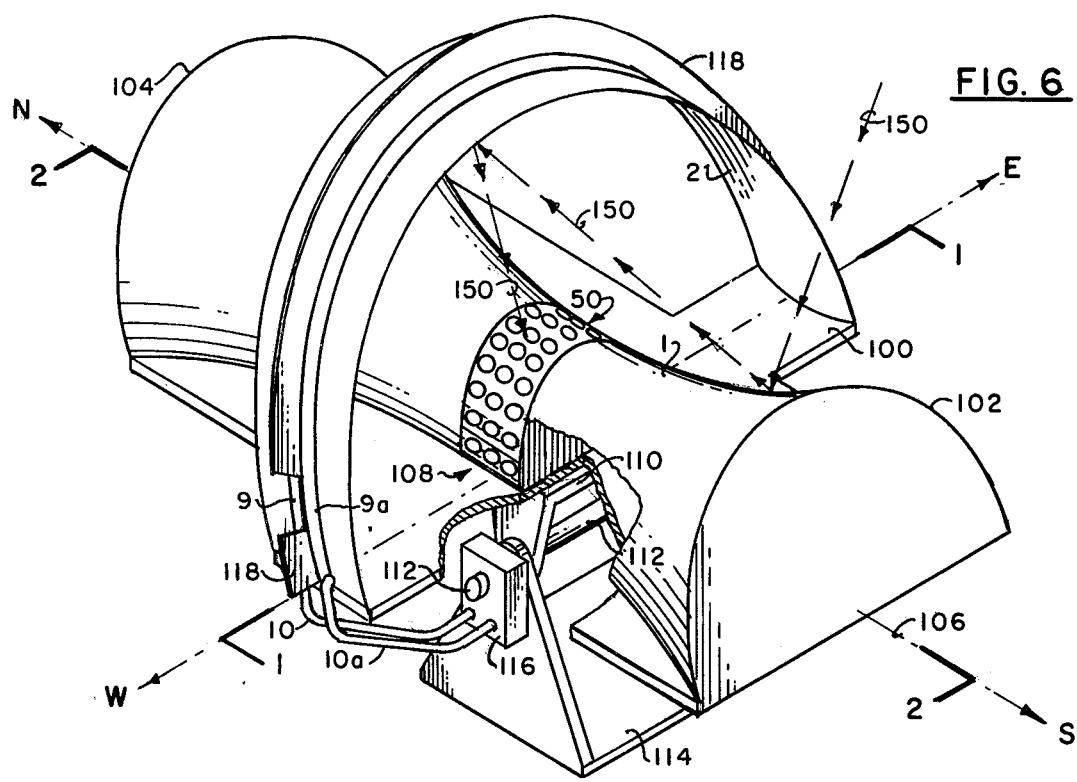
FIG. 6 is an isometric view of the apparatus of the present invention showing the relationship of the first reflector to the second reflector and the solar absorption device.

With reference to FIG. 1, there is illustrated a cross-sectional view of the apparatus of the present invention taken at lines 1—1 of FIG. 6. The section cuts through second reflector 2 and solar absorption unit 50.

Figure 2:
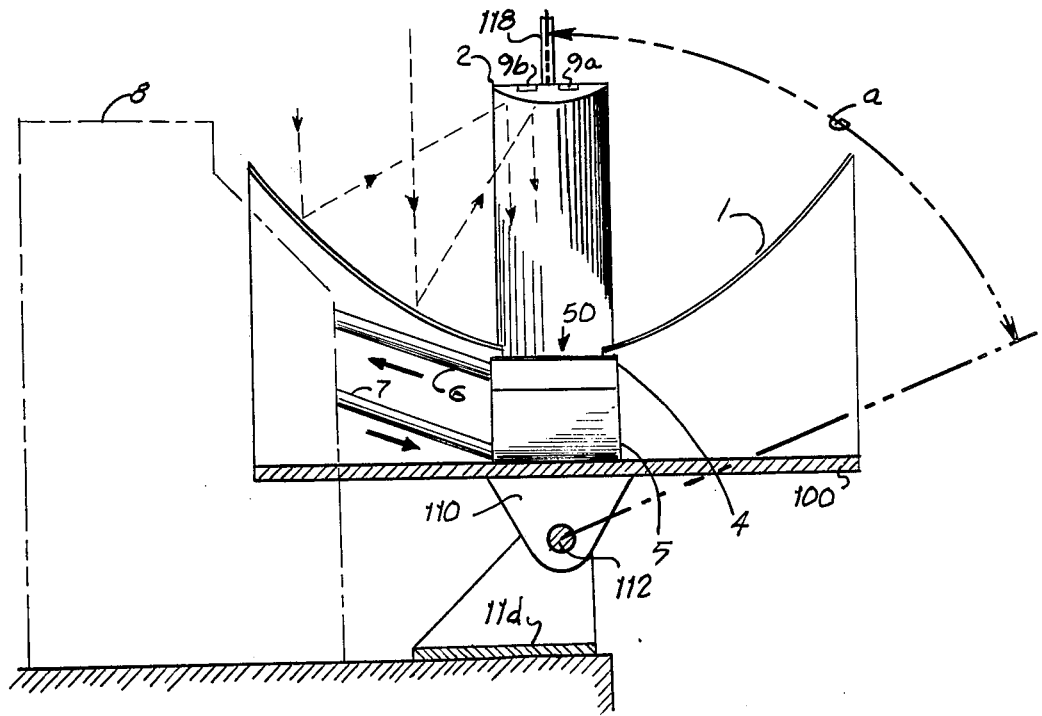
FIG. 2 is a cross-section view (east-west elevation) illustrating the alignment of the components.

FIG. 2 is a cross-sectional elevational view taken at lines 2—2 of FIG. 6.

With reference to FIG. 6, the apparatus of the present invention comprises, basically, a base support 100 upon which is mounted first reflector 1 defining a concave parabola of revolution having first flared end 102 and second flared end 104 with an axis of revolution 106 being the parabolic axis that does not intersect the parabolic surface (the directrix or an axis parallel to the directrix). The means for absorbing solar energy 50 is also mounted on base support 100 and is located is proximate the central saddle portion 108 of first reflector 1.

A second reflector 2 defining an arc is located proximate the focus of said first reflector 1 and is adapted to reflect solar energy received from first reflector 1, on to the solar energy absorption means 50.

Figure 4:
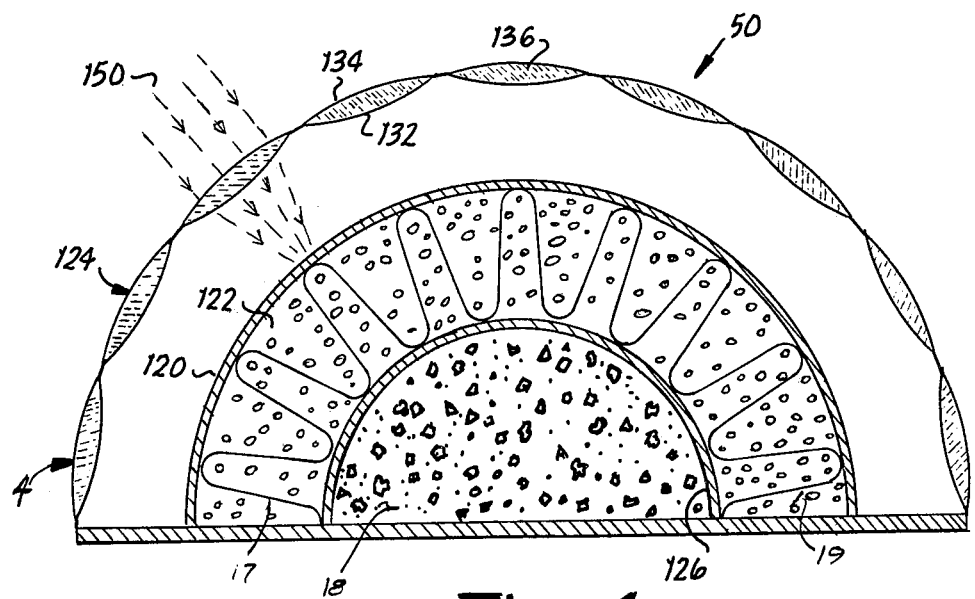
FIG. 4 is a cross-section view of the generator and reservoir assembly.

The means for absorbing solar energy 50 is shown in greater detail in FIG. 4 which is a cross-section of solar absorber 50 taken at lines 1—1 of FIG. 6.

Base support 100 is attached to bracket 110, which in turn is attached axle or shaft 112. Axle or shaft 112 is journaled to fixed base 114 which, in turn, is mounted to a foundation (not shown) which is firmly embedded in the earth.

A worm gear train 15 and a pawl and ratchet combination 14 defining tilt apparatus 60 for support base 100 is enclosed in housing 116. Tilt apparatus 60 is shown in greater detail in FIG. 3.

It will be noted that the apparatus of FIG. 6 is aligned so that the axis of rotation of first relfector 1 is in a generally a north-south direction while the axis of rotation of axle or shaft 112, which is aligned to tilt reflector 1 about an axis perpendicular to the north-south direction or the axis of rotation of first reflector 1 and parallel to the earth's surface.

First and second solar receivers 9 and 9a, which form a part of tilt apparatus 60, are shown mounted on the outside surface of arcuate reflector 2. It could also be mounted on any flat portion of base support 100 or other horizontal plane provided it is exposed to solar radiation for a major portion of the day. Central barrier 118 is shown separating the two solar receivers in an east-west direction. Conduits 10 and 10a are used to direct the expandable fluid in receivers 9 and 9a respectively, to bellows 11 and 11a for operation of pawls 12 and 12a in association with ratchet wheel 14.

With reference to FIG. 4, solar absorbing means 50 comprises, basically, a lens blanket 4 defining an arcuate cover to a solar radiation absorbing housing 120 which encloses a heat absorbing fluid 122. Housing 120 can be either transparent or can be provided with a heat absorbing or solar energy absorbing coating having a high absorptivity in the solar spectrum. A plurality of lenses 124 are provided in cover 4 to concentrate the solar radiation onto onto the surface of housing 120. A heat diffuser 17 is provided inside housing 120 and in contact therewith to better distribute the thermal energy absorbed by housing 120. An inner housing 126 is provided in which is disposed a heat sink material 18 so that the apparatus will continue to operate for short periods of time when no solar energy falls upon solar energy absorber 50. Lens blanket 4 can comprise a plurality of individual lens unit 124 which are formed by using two plastic sheets 132 and 134 between which is disposed a liquid 136. The two plastic sheets are then glued or thermally attached in a pattern to form a plurality of circles defining lenses 124.

Figure 3:
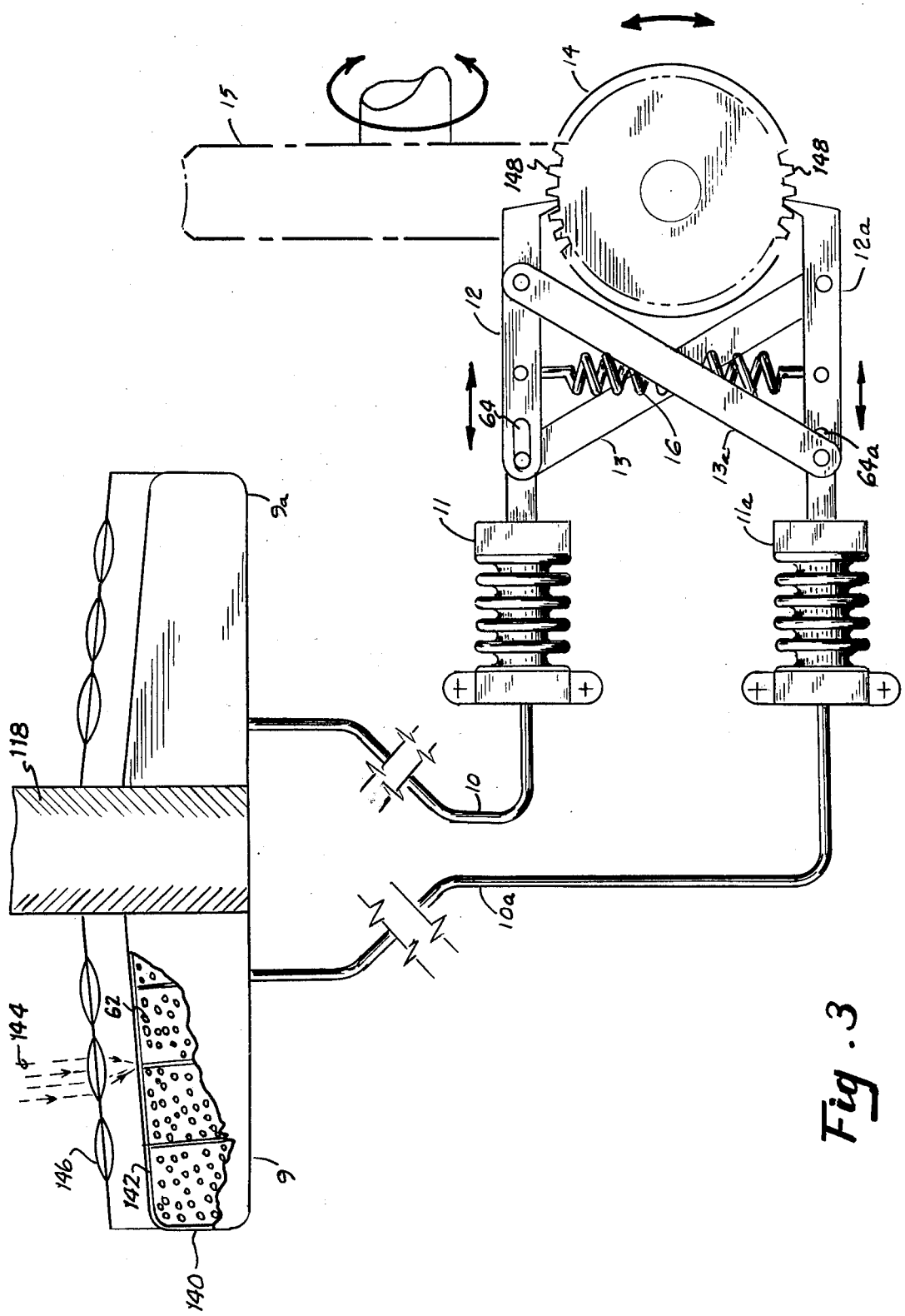
FIG. 3 is the tracking mechanism in detail.

With reference to FIG. 3, the apparatus for tilting parabolic reflector 1 so that it always is in alignment so that the sun's rays will fall on second reflector 2, comprises a first solar receiver 9 and a second solar receiver 9a between which is place a barrier 118. Solar receivers 9 and 9a comprise a housing 140 in which is contained a fluid 142 which can expand when heated by the sun's rays 144 which pass through lens blanket 146. The expanding fluid 62 then passes through conduit 10 from first solar receiver 9, or and on to bellows 11 to cause pawl 12 to push upwardly against teeth 148 of ratchet wheel 114. Ratchet wheel 114 is arranged to drive worm gear driven gear 15 which is attached to shaft 112. As previously described, shaft 112 is connected to bracket 110 which in turn is attached to base support platform 100. Thus when ratched wheel 114 is caused to rotate, base support 110 will also rotate.

In a similar manner, the thermally expandable fluid 62a in second solar receiver 9a is also communicated to bellows 11a throught conduit 10a and drives pawl 12a to engage teeth 148 of ratchet wheel 14.

It will be noted that as fluid in first solar receiver 9 is heated and expands causing pawl 12 to be forced against ratchet wheel 14 which is rotated in a counterclockwise direction. When the fluid in first solar receiver 9 is cooled and contracts, pawl 12 returns to its contracted or original position, however, pawl 12 now passes over teeth 148 by virtue of the cam and link action of links 13 and 13a.

It can also be seen that as fluid in second solar receiver 9a expands, it will cause pawl 12a to rotate ratchet wheel 14 in a clockwise direction. When the fluid in second solar receiver 9a contracts, pawl 12a will retract to its lower position passing over teeth 148.

It should be noted that pawls 12 and 12a are both connected to cross-links 13 and 13a, respectively, and also maintained in compression against ratchet wheel 14 by bias spring 16. A slot 64 is provided in pawl 12 where it is connected to the actuating arm of bellows 11, while a corresponding slot 64a is provided in pawl 12a where it is connected to bellows 11a. Cross linkages 13 and 13a in combination with slots 64 and 64a cause the opposing pawls to disengage ratchet wheel 14 when one pawl moves upwardly against teeth 148.

Thus it can be seen that where the solar energy falling on first solar energy receiver 9 is the same as the solar energy falling on solar energy receiver 9a is the same, pawls 12 and 12a will act equally to cause each other to disengage from ratchet wheel 14 causing no rotation of axle or shaft 112.

When the solar radiation on first solar receiver 9 is greater than that on second solar receiver 9a, pawl 12 will then cause a counterclockwise rotation of ratchet wheel 14. Thus rotating shaft 112 to cause barrier 118 and first solar receiver and second solar receiver 9a to tilt to a position where the solar energy on each side is equal.

Figure 7:
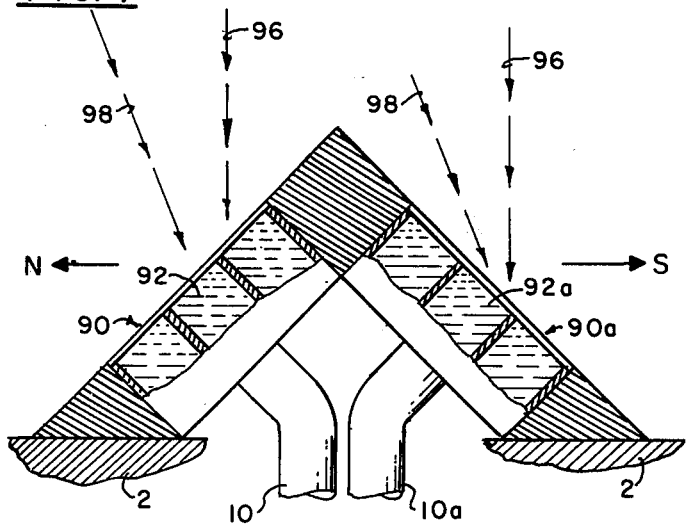
FIG. 7 is a cross-section of another embodiment of the solar receivers used to actuate the means for rotating the apparatus of FIG. 6 so that it maintains its alignment with the sun during its seasonal changes in declination.

With reference to FIG. 7, there is illustrated a further embodiment of the solar receivers of the present invention for maintaining reflector 1 at its proper focus and alignment with the sun. The solar receivers of FIG. 7 comprises, basically, a first solar receiver 90 filled with a thermally expandable fluid 92 which passes through conduit 10 to the ratchet wheel and bellows system shown in FIG. 3. Second solar receiver 90a also comprises a thermally expandable fluid 92a which passes through conduit 10a to drive a ratchet and pawl combination similar to that shown in FIG. 3. It will be noted that first solar receiver 90 is arranged at 90 degrees to second solar receiver 90a, while both receivers are arranged at 45 degrees to the outside surface of second reflector 2 (or the surface of base support 100).

To operate the solar refrigeration system of the present invention, solar receivers 90 and 90a should face in a north-south direction. When first reflector 1 is properly aligned with the sun, the solar energy rays 96 will fall equally on first solar receiver 90 and second solar receiver 90a. The resulting energy received on first solar receiver 90 and second second solar receiver 90a will be the cosine of the angle (45 degrees) at which the rays 96 strike the surface of receivers 90 and 90a times the horizontal energy component.

When reflector 1 is not aligned properly, as shown by solar rays 98, more energy will be measured by first solar receiver 90 because of the almost perpendicular angle of incidence of solar rays 98, while less energy will be received by second solar receiver 90a because of the greater angle of incidence of solar rays 98. Therefore, it can be seen, in a manner similar to that described for FIG. 3, bellows 11 and 11a and pawls 12 and 12a will operate to rotate shaft 112 to bring the receivers shown in FIG. 7 into proper alignment to receive equal energy from the solar rays.

The solar collector (FIG. 1) is constructed as a semicircular annular ring, the cross-section of which is a parabolic reflector (FIG. 2) and a focal mirror located between the reflector and the loci of the parabola. The collector is installed with unobstructed exposure to the sun from sunrise to sunset (the major parabolic axis aligned east and west) and exposure to the winter horizon to allow for the sun's seasonal inclination.

The tracking mechanism 3 (FIG. 3) will cause the collector to follow the sun's seasonal declination (north-south) and return as follows:

The total mechanism is completely filled with a fluid having a thermal expansion value of approximately 0.0004% of volume. The expansion chambers 9 are mounted in the collector such that one will be exposed to the sun while the other is shaded (north-south). As the sun moves from its zenith to the southern horizon (and returns) it will shine fully on the exposed chamber causing the fluid to heat and expand. This expansion through adequate conduiting 10 will advance a spring return type linear actuator 11 (a bellows type shown) to which is affixed a feed pawl 12 towards the ratchet device or wheel 14. Through linkage 13 this movement will clear the opposing pawl 12a from the ratched 14 and allow the driven pawl 12 to advance the ratchet and drive the worm gear train 15 to rotate shaft 112 and the collector with the sun.

The angular travel "a" will continue until the opposite chamber 9a is exposed to the sun causing both chambers to heat and expand equally, causing both bellows 11 and 11a actuators to advance and clear the opposing pawl from the ratchet. The collector assembly is held in place by the action of the reduction in the gear drive.

The reverse sequence will cause the collector to rotate from the horizon to the summer zenith. Cooling the fluid will cause both bellows drives to return to their rearmost position. A spring 16 common to the feed pawls is affixed to provide contact of the pawl to the ratchet.

Sun rays entering the collector are reflected from the first reflector or parabolic reflector or mirror 1 to the focal point. These rays are intercepted by the second reflector or focal mirror 2. The focal mirror shape is such that impinging rays are reflected in an essentially parallel band downward to the Vapor Generator or solar absorption member 50 (FIG. 4).

Figure 5:
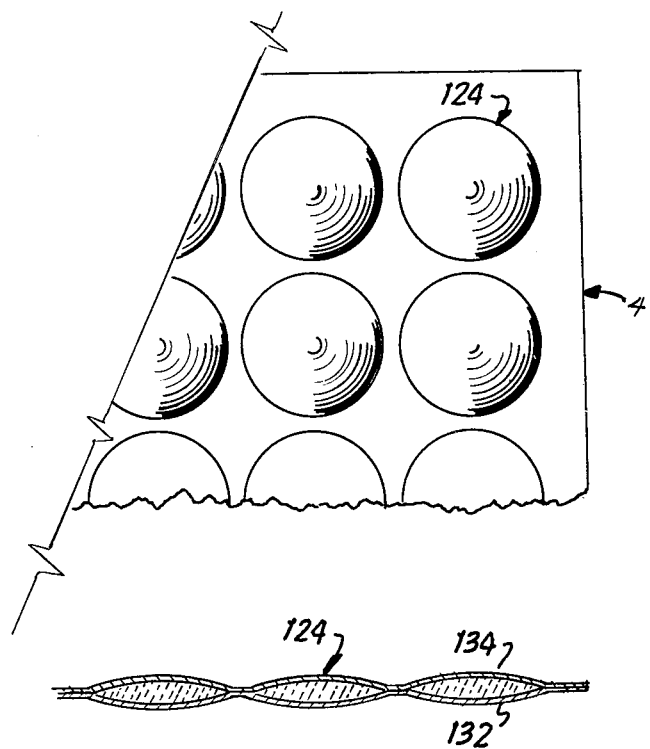
FIG. 5 is an illustration of the construction of the blanket lens.

The rays pass through a lens blanket 4 (FIG. 5), which consists of a multiple of thin lens made of a pattern to concentrate this energy onto an annular shaped reservoir (FIG. 5) such that it is focused on a heat diffuser 17 within the reservoir and in contact with the outer and inner walls.

The diffuser acts to distribute the heat within the solution and allows heat to transfer through the reservoir to be absorbed by a suitable heat sink material 18 in contact with the outer wall. This is to prolong the vaporization of the solution after sunset.

The heat of the appropriate solution 19 (a water-ammonia mixture) drives off an ammonia vapor that is piped to the gas absorption unit through conduit 6 to begin the refrigeration cycle. As the vapor is condensed throughout the cycle the resulting liquid is returned to the vapor generator via conduit 7 to continue the cycle.

To operate the apparatus of the present invention, the apparatus is placed, as shown in FIG. 6, with the axis of rotation of first reflector 1 in the generally north-south direction. As the sun rises in the morning in the east, the sun's rays 150 will strike parabolic mirror or reflector 1 and will be reflected to arcuate second reflector 2 where they are reflected downwardly toward solar absorption member 50. As the sun approaches its zenith, if first reflector 1 is not properly aligned to allow the solar rays to reflect from reflector 2 down to solar absorber 50, such misalignment will be detected by first solar receiver 9 and second solar receiver 9a which is separated by vertical barrier 118, and one will receive unequal amounts of solar energy. As previously described, the fluid in each of the solar receivers will expand differentially causing the apparatus to rotate and to align itself with the solar rays. Thus first reflector 1 is always maintained in proper alignment with the incoming solar energy rays to properly focus the energy on to solar energy absorbing member 50.

I claim:
1. A solar energy refrigeration system comprising
a base support,
a first reflector defining a concave parabola of revolution having first and second flared ends, an axis of revolution and a central saddle region, said reflector mounted on said base support,
means for absorbing solar energy mounted on said base support and located proximate said central saddle region of said first reflector,
said means for absorbing solar energy having means defining an arcuate housing having a solar radiation absorbing surface,
a second reflector defining an arc located proximate the focus of said first reflector and adapted to reflect solar energy received from said first reflector on to said means for absorbing solar energy, and
means for cooling a space, said means connected to said means for absorbing solar energy.
2. The apparatus as claimed in claim 1 further comprising
means for rotating said first reflector and maintaining said axis of revolution of said first reflector at all times perpendicular to the rays of the sun comprising
a first solar receiver defining a generally flat plate and comprising
means defining a housing containing a thermally expandable fluid,
a second solar receiver defining a generally flat plate and comprising
means defining a housing containing a thermally expandable fluid,
means connected to said first solar receiver for actuating said means for rotating said base support in a clockwise direction, said means connected to said first solar receiver and comprising a ratchet wheel and pawl, means connected to said second solar receiver for actuating said means for rotating said base support in a counterclockwise direction, said means connected to said second solar receiver, and comprising a ratchet wheel and pawl, and means for causing unequal amounts of solar energy to fall on said first and second solar receivers when said axis of rotation of said parabola of revolution is not perpendicular to the rays of the sun.

3. Apparatus for aligning a solar energy converter with the sun comprising a first solar receiver defining a generally flat plate and comprising means defining a housing containing a thermally expandable fluid, a second solar receiver defining a generally flat plate and comprising means defining a housing containing a thermally expandable fluid, a shaft attached to said solar energy converter means for rotating said shaft comprising a ratchet wheel, means for actuating said ratchet wheel in a clockwise direction comprising a first pawl, said first pawl connected to said first solar receiver and said expandable fluid, means for actuating said ratchet wheel in a counterclockwise direction comprising a second pawl, said second pawl connected to said second solar receiver and said expandable fluid, and means for causing unequal amounts of solar energy to fall on said first and second solar receivers when said solar energy converter surface is not perpendicular to the rays of the sun.

4. A solar energy refrigeration system comprising a base support, a first reflector defining a concave parabola of revolution having first and second flared ends, an axis of revolution and a central saddle region, said reflector mounted on said base support, means for absorbing solar energy mounted on said base support and located proximate said central saddle region of said first reflector, a second reflector defining an arc located proximate the focus of said first reflector and adapted to reflect solar energy received from said first reflector on to said means for absorbing solar energy, and means for cooling a space, said means connected to said means for absorbing solar energy.

means for rotating said base support about an axis of rotation perpendicular to the axis of rotation of said first reflector and parallel to the surface of the earth comprising, a first solar receiver defining a generally flat plate and comprising means defining a housing containing a thermally expandable fluid, a second solar receiver defining a generally flat plate comprising, means defining a housing containing a thermally expandable fluid, means connected to said first solar receiver for actuating said means for rotating said base support in a clockwise direction comprising, a fixed base attached to the earth, a first bellows connected to said fixed base and adapted to reciprocate when said fluid in said first solar receiver expands and contracts, a ratchet wheel attached to said base support and having teeth about the periphery thereof, a first pawl connected to said bellows and adapted to engage said teeth of said first ratchet wheel when moving in one direction whereby said ratchet wheel is rotated in a clockwise direction, means, connected to said second solar receiver, for actuating said means for rotating said base support in a counterclockwise direction comprising, a bellows connected to said fixed base and adapted to reciprocate when said fluid in said first solar receiver expands and contracts, a second pawl connected to said bellows and adapted to engage said teeth of said ratchet wheel when moving in one direction whereby said ratchet wheel is rotated in a counterclockwise direction, means for causing unequal amounts of solar energy to fall on said first and second solar receivers when said axis of rotation of said parabola of revolution is not perpendicular to the rays of the sun.

5. A solar energy refrigeration system comprising a base support, a first reflector defining a concave parabola of revolution having first and second flared ends, an axis of revolution and a central saddle region, said reflector mounted on said base support, means for absorbing solar energy mounted on said base support and located proximate said central saddle region of said first reflector, a second reflector defining an arc located proximate the focus of said first reflector and adapted to reflect solar energy received from said first reflector on to said means for absorbing solar energy, and means for cooling a space, said means connected to said means for absorbing solar energy, means for rotating said base support about an axis of rotation perpendicular to the axis of rotation of said first reflector and parallel to the surface of the earth comprising, a first solar receiver defining a generally flat plate and comprising means defining a housing containing a thermally expandable fluid, a second solar receiver defining a generally flat plate comprising, means defining a housing containing a thermally expandable fluid, means connected to said first solar receiver for actuating said means for rotating said base support in a clockwise direction comprising, a fixed base attached to the earth, a first bellows connected to said fixed base and adapted to reciprocate when said fluid in said first solar receiver expands and contracts, a ratchet wheel attached to said base support and having teeth about the periphery thereof, a first pawl connected to said bellows and adapted to engage said teeth of said first ratchet wheel when moving in one direction whereby said ratchet wheel is rotated in a clockwise direction, means for causing unequal amounts of solar energy to fall on said first and second solar receivers when said axis of rotation of said parabola of revolution is not perpendicular to the rays of the sun.

6. A solar energy refrigeration system comprising a base support,
   a first reflector defining a concave parabola of revolution having first and second flared ends, an axis of revolution and a central saddle region, said reflector mounted on said base support,
   means for absorbing solar energy mounted on said base support and located proximate said central saddle region of said first reflector,
   a second reflector defining an arc located proximate the focus of said first reflector and adapted to reflect solar energy received from said first reflector on to said means for absorbing solar energy, and
   means for cooling a space, said means connected to said means for absorbing solar energy,
   means for rotating said base support about an axis of rotation perpendicular to the axis of rotation of said first reflector and parallel to the surface of the earth comprising,
   a first solar receiver defining a generally flat plate and comprising
   means defining a housing containing a thermally expandable fluid,
   a second solar receiver defining a generally flat plate comprising,
   means defining a housing containing a thermally expandable fluid,
   means, connected to said second solar receiver, for actuating said means for rotating said base support in a counterclockwise direction comprising,
   a bellows connected to said fixed base and adapted to reciprocate when said fluid in said first solar receiver expands and contracts,
   a ratchet wheel attached to said base support and having teeth about the periphery thereof,
   a second pawl connected to said bellows and adapted to engage said teeth of said ratchet wheel when moving in one direction whereby said ratchet wheel is rotated in a counterclockwise direction,
   means for causing unequal amounts of solar energy to fall on said first and second solar receivers when said axis of rotation of said parabola of revolution is not perpendicular to the rays of the sun.

7. A solar energy refrigeration system comprising
a base support,
   a first reflector defining a concave parabola of revolution having first and second flared ends, an axis of revolution and a central saddle region, said reflector mounted on said base support,
   means for absorbing solar energy mounted on said base support and located proximate said central saddle region of said first reflector,
   said means for absorbing solar energy having means defining an arcuate housing having a solar radiation absorbing surface,
   a heat diffuser disposed within said housing in thermal communication with said housing, and
   a plurality of lenses spaced apart from said housing and adapted to focus solar radiation on said housing,
   a second reflector defining an arc located proximate the focus of said first reflector and adapted to reflect solar energy received from said first reflector on to said means for absorbing solar energy, and
   means for cooling a space, said means connected to said means for absorbing solar energy.

* * * * *